No. 871,039.
PATENTED NOV. 12, 1907.
M. JACKSON.
IRRIGATING OR DITCHING PLOW.
APPLICATION FILED MAR. 20, 1907.
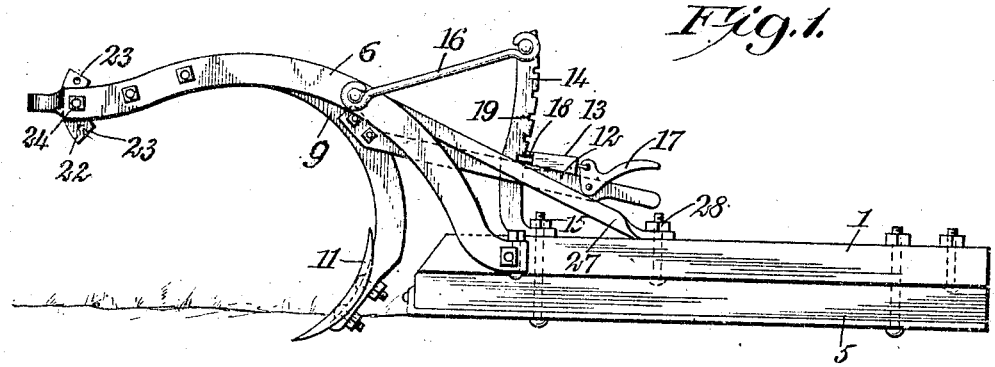
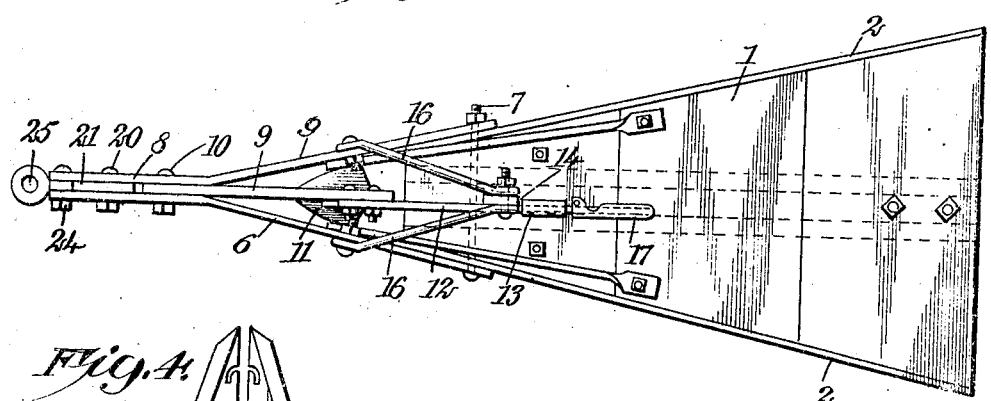
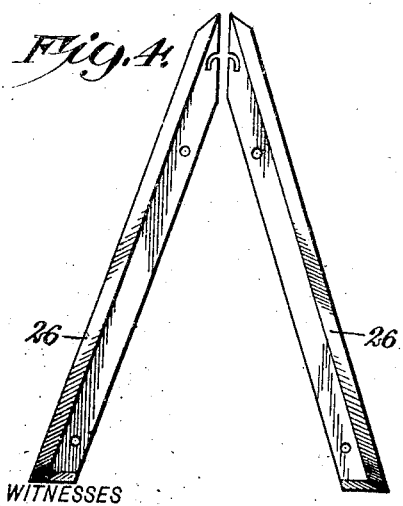
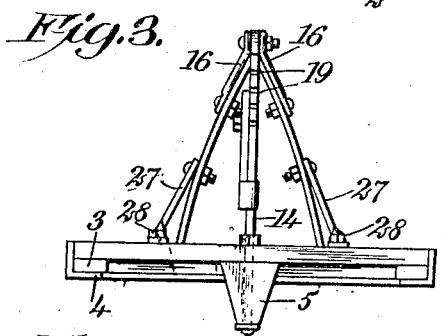
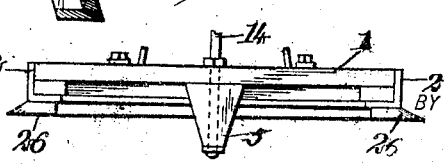
WITNESSES
INVENTOR
Martin Jackson
BY
ATTORNEYS

UNITED STATES PATENT OFFICE.

MARTIN JACKSON, OF MABTON, WASHINGTON.

IRRIGATING OR DITCHING PLOW.

No. 871,039.  Specification of Letters Patent.  Patented Nov. 12, 1907.

Application filed March 20, 1907. Serial No. 363,415.

*To all whom it may concern:*

Be it known that I, MARTIN JACKSON, a citizen of the United States, and a resident of Mabton, in the county of Yakima and State of Washington, have invented a new and Improved Irrigating or Ditching Plow, of which the following is a full, clear, and exact description.

This invention relates to plows, and the object of the invention is to produce a plow which is especially adapted for making ditches, for clearing ditches already constructed or for cultivating between the rows of corn, potatoes, etc.

A further object is to provide a construction which will enable a plow to have a knife attached thereto for cutting away the roots of weeds and similar growth between the rows when the device is used as a cultivator.

The invention consists in the construction and combination of parts to be more fully described hereinafter and particularly set forth in the claims.

Reference is to be had to the accompanying drawings forming a part of this specification, in which similar characters of reference indicate corresponding parts in all the figures.

Figure 1 is a side elevation of a plow constructed according to my invention; Fig. 2 is a plan of the plow; Fig. 3 is a rear elevation; Fig. 4 is a plan of two knives which are adapted to be attached to the plow, as will appear hereinafter; and Fig. 5 is a rear elevation of the plow, representing the same with the knives attached; the upper portion of the plow in this view is broken away.

Referring more particularly to the parts, 1 represents a platform of substantially triangular form, presenting side frames 2 formed of angle iron, as indicated, which converge toward the forward extremity of the plow as shown in Fig. 2. This platform 1 is formed of planks which are laid transversely upon battens 3 which lie upon the flanges 4 of the angle irons 2 as shown in Fig. 3. Extending longitudinally of the platform on the under side thereof there is provided a keel or rudder 5, consisting of a stout timber, the sides of which converge downwardly, as indicated. The platform 1 is adapted to be drawn along by a horse or other draft animal. At the forward end of the platform thills 6 are provided, consisting of flat bars of iron curved as shown in Fig. 1; the rear extremities of the thills being attached to the side frames 2 of the platform by means of a through-bolt 7, as shown most clearly in Fig. 2.

The forward portions of the thills 6 are formed with parallel tongues 8 which lie a short distance apart, and between these tongues near the rear portions thereof a plow-arm 9 is pivotally attached on a suitable bolt 10. This plow-arm is curved, as indicated in Fig. 1, and its lower end is provided with a removable hoe 11 which is adapted to dig into the earth as the plow is advanced. At a suitable point near the rear of the arm 9, the same is provided with a rearwardly extending lever 12. This lever is provided with a locking mechanism 13 coöperating with a segment 14, which segment is attached at its lower end by means of a bolt 15 to the upper side of the platform near the central portion thereof. The upper end of the segment 14 is connected with the thills 6 by suitable diagonal braces or links 16. In this way the thills and the segment are connected to form a rigid structure.

In connection with the locking mechanism 13 for the lever 12 I provide a finger lever 17 which enables the locking bolt 18 to be disengaged from the notches 19 of the segment. It should be understood that the plow-arm 9 has a free pivotal movement on the bolt 10, so that by raising or lowering the lever 12, the elevation of the hoe 11 with respect to the ground level, may be changed as desired. Between the tongues 8 forward of the bolt 10 a similar pivot bolt 20 is provided upon which there is pivotally attached a clevis 21. The forward extremity of this clevis is formed into a short arc or bow 22 provided with a plurality of openings 23. I have illustrated this bow with three openings, through any one of which a fastening bolt 24 may pass near the forward ends of the tongues, and this bow affords means for securely holding the clevis, as will be readily understood. The forward extremity of the clevis is formed into an eye 25 to which a whiffletree may be attached. If it is desired to hold the eye 25 in a more elevated position, the clevis is adjusted upwardly so that the bolt 24 may be passed through the lowermost of the openings 23, and vice versa.

In order to adapt the device to be used as a weed cutter or cultivator between rows of corn or similar crops, I provide knives 26 as illustrated in Fig. 4; the outer edges of the said knives being beveled. These knives are attached to the under faces of the angle irons 2 as shown in Fig. 5, and the cutting edges of the knives project beyond the outer faces of the irons. The keel or rudder 5 runs in the furrow made by the hoe 11 and the bottom of the platform slides on the ground as the implement is drawn along.

In order to hold the thills securely, I provide side braces or diagonals 27 which attach to the thills at the same points as the braces 16, and these are attached by bolts 28 to the upper side of the platform.

Having thus described my invention, I claim as new and desire to secure by Letters Patent:

1. In a plow of the class described, in combination, a substantially triangular platform adapted to rest upon the earth, a hoe mounted forwardly thereof and adapted to form a furrow before said platform, and a keel on the under side of said platform, extending longitudinally thereof and running in the furrow formed by said hoe.

2. In a plow of the class described, in combination, a platform adapted to run upon the earth, thills attached thereto, a hoe-bar pivotally attached to said thills forwardly, and means for adjusting and locking said hoe-bar with respect to said platform.

3. In a plow of the class described, in combination, a platform adapted to run upon the earth, a keel projecting downwardly from the under side thereof, a pair of thills attached to said platform forwardly, a hoe-bar attached to said thills and carrying a hoe, and means for adjusting said hoe-bar.

In testimony whereof I have signed my name to this specification in the presence of two subscribing witnesses.

MARTIN JACKSON.

Witnesses:
M. L. WALKER,
T. Y. PAYN.